(12) United States Patent
Sullenberger et al.

(10) Patent No.: US 7,447,901 B1
(45) Date of Patent: Nov. 4, 2008

(54) METHOD AND APPARATUS FOR ESTABLISHING A DYNAMIC MULTIPOINT ENCRYPTED VIRTUAL PRIVATE NETWORK

(75) Inventors: Michael L. Sullenberger, San Jose, CA (US); Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 698 days.

(21) Appl. No.: 10/247,695

(22) Filed: Sep. 18, 2002

Related U.S. Application Data

(60) Provisional application No. 60/391,745, filed on Jun. 25, 2002.

(51) Int. Cl.
*H04L 9/00* (2006.01)
(52) U.S. Cl. ........................... 713/153; 726/15
(58) Field of Classification Search ............. 713/1, 713/2, 188, 194, 153; 380/200, 201, 255, 380/277; 176/2, 15
See application file for complete search history.

(56) References Cited

U.S. PATENT DOCUMENTS

| | | | |
|---|---|---|---|
| 5,600,644 A | 2/1997 | Chang et al. | |
| 6,069,895 A | 5/2000 | Ayandeh | |
| 6,078,957 A * | 6/2000 | Adelman et al. | 709/224 |
| 6,172,981 B1 | 1/2001 | Cox et al. | |
| 6,175,917 B1 * | 1/2001 | Arrow et al. | 713/1 |
| 6,269,099 B1 | 7/2001 | Borella et al. | |
| 6,353,614 B1 | 3/2002 | Borella et al. | |
| 6,438,612 B1 | 8/2002 | Ylonen et al. | |
| 6,567,405 B1 | 5/2003 | Borella et al. | |
| 6,675,225 B1 | 1/2004 | Genty et al. | |
| 6,697,354 B1 | 2/2004 | Borella et al. | |
| 6,731,642 B1 | 5/2004 | Borella et al. | |
| 6,751,729 B1 | 6/2004 | Giniger et al. | |
| 6,768,743 B1 | 7/2004 | Borella et al. | |
| 6,781,982 B1 | 8/2004 | Borella et al. | |

(Continued)

OTHER PUBLICATIONS

S. Hanks, et al., Network Working Group, Request for Comments: 1701, "Generic Routing Encapsulation (GRE)," Oct. 1994, pp. 1-8.

(Continued)

*Primary Examiner*—Kimyen Vu
*Assistant Examiner*—Joseph Pan
(74) *Attorney, Agent, or Firm*—Hickman Palermo Truong Becker LLP

(57) ABSTRACT

A process is disclosed in which a security policy is associated with a virtual private network (VPN) interface at a first device, for example, a router. Input is received specifying an association of a VPN endpoint address to a corresponding routable network address of a second device. A message is issued to a security module at the first device, the message including the routable network address of the second device and the security policy. Encryption state information is generated for network traffic from the first device to the second device, based on the message. The process is applicable to a hub-and-spoke network architecture that utilizes a point-to-multipoint GRE tunnel and the IPsec protocol for security. The process is dynamic in that the encryption state is generated for traffic over a VPN link, in response to notification of a virtual address-to-real address mapping, i.e., the association. In an embodiment, the association is an NHRP mapping.

26 Claims, 4 Drawing Sheets

U.S. PATENT DOCUMENTS

| | | | |
|---|---|---|---|
| 6,822,957 | B1 | 11/2004 | Schuster et al. |
| 6,931,010 | B2 | 8/2005 | Gallant et al. |
| 6,996,621 | B1 | 2/2006 | Borella et al. |
| 7,013,338 | B1 | 3/2006 | Nag et al. |
| 7,032,242 | B1 | 4/2006 | Grabelsky et al. |
| 7,130,854 | B2 * | 10/2006 | Beadles et al. ............... 717/10 |
| 2001/0036184 | A1 * | 11/2001 | Kinoshita et al. ........... 370/389 |
| 2002/0075844 | A1 | 6/2002 | Alexander |
| 2002/0080752 | A1 | 6/2002 | Johansson et al. |
| 2002/0103898 | A1 | 8/2002 | Moyer et al. |
| 2002/0114274 | A1 | 8/2002 | Sturges et al. |
| 2002/0152325 | A1 | 10/2002 | Elgebaly et al. |
| 2003/0108051 | A1 | 6/2003 | Bryden et al. |
| 2003/0163440 | A1 * | 8/2003 | Tonack .......................... 707/1 |
| 2004/0213206 | A1 | 10/2004 | McCormack et al. |

OTHER PUBLICATIONS

J. Luciani, et al., Network Working Group, Requests for Comments: 2332, "NBMA Next Hop Resolution Protocol (NHRP)," Apr. 1998, pp. 1-52.

S. Kent, et al., Network Working Group, Request for Comments: 2401, "Security Architecture for the Internet Protocol," Nov. 1998, http://www.ietf.org/rfc/rfc2401.txt, pp. 1-62.

D. Piper, Network Working Group, Request for Comments: 2407, "The Internet IP Security Domain of Interpretation for ISAKMP," Nov. 1998, pp. 1-32.

D. Maughan, et al., Network Working Group, Request for Comments: 2408, "Internet Security Association and Key Mangement Protocol (ISAKMP)," Nov. 1998, pp. 1-86.

D. Harkins, et al., Network Working Group, Request for Comments: 2409, "The Internet Key Exchange (IKE)," Nov. 1998, pp. 1-41.

R. Thayer, et al., Networking Working Group, Request for Comments: 2411, "IP Security, Document Roadmap," Nov. 1998, pp. 1-11.

B. Fox, et al., Network Working Group, Request for Comments: 2735, "NHRP Support for Virtual Private Networks," Dec. 1999, pp. 1-12.

Michael L. Sullenberger, Information Disclosure Statement "B", attached herewith, Jan. 2003, 2 pages.

Henning Schulzrinne et al., "Tutorial: The IETF Internet Telephony Architecture and Protocols," 1999, http://www.computer.org/internet/telephony/w3schrosen.htm, printed May 21, 2002, 17 pages.

International Engineering Consortium, "Trillium, H.323, 8.H.225 Registration, Admission, and Status," 2002, 2 pages.

Church of the Swimming Elephant, "Connected: An Internet Encylopedia, Q.931 Protocol Overview," 2001, http://webmail.cotse.com/CIE/Topics/126.htm, printed May 9, 2002, pp. 1-7.

Cisco Systems, Inc., "Chapter I, Product Overview," 1989-1998, pp. 1-1-1-10.

Cisco Systems, Inc., "Chapter 3, Connecting to a Host through a Remote Access Server," 1989-1998, pp. 3-1-3-26.

M. Handley et al., "SIP: Session Initiation Protocol," Network Working Group, Request for Comments: 2543, Mar. 1999, pp. 1-153.

M. Arango et al., "Media Gateway Control Protocol (MGCP) Version 1.0," Network Working Group, Request for Comments: 2705, Oct. 1999, pp. 1-134.

* cited by examiner

METHOD AND APPARATUS FOR ESTABLISHING A DYNAMIC MULTIPOINT ENCRYPTED VIRTUAL PRIVATE NETWORK

CROSS REFERENCE TO RELATED APPLICATIONS

This application is related to and claims the benefit of domestic priority under 35 U.S.C. § 119(e) from U.S. Provisional Patent Application No. 60/391,745, entitled "Method and Apparatus For Establishing A Dynamic Multipoint Encrypted Virtual Private Network" filed on Jun. 25, 2002, which is incorporated by reference in its entirety for all purposes, as if fully set forth herein.

FIELD OF THE INVENTION

The present invention generally relates to communication networks. The invention relates more specifically to a method and apparatus for establishing a dynamic multipoint encrypted virtual private network (VPN).

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Virtual Private Network

A virtual private network (VPN) is a private data network that makes use of the public packet-switched telecommunication infrastructure, maintaining privacy through the use of a tunneling protocol, such as GRE, and encryption or security protocols, such as IPsec. A virtual private network can be contrasted with a system of privately owned or leased lines that can only be used by one organization or entity. VPNs give an organization the same capabilities at much lower cost by using the shared public infrastructure rather than a private one.

Tunneling, and the use of a VPN, is not intended as a substitute for encryption/decryption. In cases where a high level of security is necessary, other encryption should be used within the VPN itself.

IPsec Protocol

The IPSec protocol and related protocols such as IKE and ISAKMP (collectively referred to as IPSec) provides a standards-based method of providing privacy, integrity, and authenticity to information transferred point-to-point among peers across IP networks, such as the public Internet and private local networks. IPSec provides IP network-layer encryption. That is, it provides security at the packet-processing layer of network communication.

IPSec defines formats of packet headers to be added to IP packets, including the authentication header (AH) to provide data integrity and the encapsulating security payload (ESP) to provide confidentiality and data integrity. Furthermore, key management and security associations are negotiated with the Internet Key Exchange (IKE). A security association (SA) is a set of IPSec parameters between two devices. Because the encrypted packets appear to be ordinary packets, they can easily be routed through any IP network without changes to the intermediate network equipment.

Several papers on various aspects of IPSec are available at the time of writing, and can be located via the document "ipsec.html" in directory "ids.by.wg" of domain "ietf.org". In addition, numerous RFCs (Request For Comment) are available from the Network Working Group of the IETF (Internet Engineering Task Force), and can be located via the document "rfc.html" of domain "ietf.org".

IPSec provides two modes of operation: transport mode and tunnel mode. In transport mode, only the IP payload is encrypted, with the original IP headers left intact. This mode adds minimal bytes to each packet. In tunnel mode, the entire original IP packet is encrypted and it becomes the payload in a new IP packet. This allows a network device, such as a router or gateway, to act as an IPSec proxy and perform encryption on behalf of the hosts. The source router or gateway encrypts packets and forwards them along the IPSec tunnel, and the destination router or gateway decrypts the original packet and forwards it to the destination host.

Hub and Spoke Network Architecture

Currently IPsec VPN networks are established using point-to-point links among routers or switches that participate in the VPNs. This is a natural way to set up encrypted networks since encryption involves establishing a shared secret between the two endpoints so that each end can decrypt what the other end has encrypted. The most efficient way to manage larger and larger collections of these point-to-point links is to arrange them into hub-and-spoke networks.

In hub-and-spoke networks, all traffic from behind one spoke to behind another spoke traverses first to the hub and then back out to the other spoke. Thus, packet latency is increased because all network traffic between end points is routed through the hub. Furthermore, secure traffic is encrypted and decrypted twice: first, between the source spoke and the hub; and second, between the hub and the destination spoke. This is because encryption/decryption keys must be exchanged between only two points. Hence, this architecture causes increased load on the hub router, which is required to perform many encryption operations.

Multicasting is communication between a single source and selected multiple destinations on a network. Teleconferencing and videoconferencing, for example, are technologies that may utilize multicasting protocols. Broadcasting is communication that is simultaneously transmitted from a source to all destinations on a network. IPsec does not readily support IP multicast or broadcast packets, due to challenges with managing the encryption keys associated with IPsec secure associations with respect to such packets.

Since IPsec does not readily support broadcasting of IP packets, it also does not support any interior dynamic routing protocol (e.g., RIP, OSPF, EIGRP), since these protocols rely on broadcasting/multicasting for their operation. Thus, currently all routing of packets over an IPsec VPN utilizes static routing. Consequently, any time there is a change, addition or removal of equipment in the network, routing information must be updated manually, which is not manageable in a large VPN network.

One technique to overcome the above multicast/broadcast restriction is to use another tunneling protocol such as GRE to first tunnel the IP data packets, including multicast/broadcast packets, and then use IPsec to encrypt (transport mode) the GRE encapsulated packets. This technique, therefore, allows the support of dynamic routing protocols and IP multicast over the VPN network. However, this technique requires the hub router to know the IP address of all the spoke routers, since the GRE tunnel endpoints are configured manually. Often, the spoke routers are connected to the network via DSL or cable modem links. It is typical for such routers to be assigned an IP address dynamically, that is, each time they reboot or reload. Implementing a network in which the hub router knows the IP address of all of the spoke routers increases costs significantly since the spoke routers need to have static IP addresses. Furthermore, the hub router needs to be larger with respect to, for example, configuration information and computational capability, since it will be one endpoint of all of the point-to-point links and is in the path for all spoke-to-spoke traffic.

Full Mesh Network Architecture

A typical approach to solving the foregoing shortcomings of having a single hub router utilizes a static full-mesh VPN network architecture. In a full-mesh architecture, each router or switch has a link to every other router or switch in the VPN. However, a static full-mesh network requires all nodes in the network to be configured with information about all other nodes in the network. The resulting configuration files are large and difficult to manage. Also, all nodes must set up VPN point-to-point links with all other nodes in the network by negotiating encryption keys, which are maintained at all times whether they are needed or not.

Currently, the maximum size of IPsec full mesh networks is limited by the number of simultaneous IPsec tunnels that must be supported on each node in the mesh. In practice, the limiting factor is the number of tunnels that can be supported by the smallest hardware platform used in the mesh. An additional problem is the size of the router configuration files for mesh networks, and the size of the hub router in hub-and-spoke networks. In both cases, each configuration must include numerous lines per tunnel for defining crypto-maps, access control lists (ACLs), and definitions of tunnel interfaces for GRE tunnels. As the number of peers gets large, the configuration becomes huge.

Hence, instead of having <n> IPsec VPN links to connect <n> remote sites, there are <($n^2-n$)/2> IPsec VPN links to connect <n> remote sites. To support this architecture, all routers in the VPN network must be as large, in terms of processing power and storage capacity, as the hub router in the hub-and-spoke network, since all nodes must be the end point for <n> links. This significantly increases the cost to deploy the IPsec VPN network. Furthermore, the complexity of the IPsec VPN network increases dramatically, which decreases the manageability of the VPN network significantly. Also, when adding a new node to the full-mesh VPN network, all other nodes in the network must also be modified, that is, they need to be reconfigured to add information regarding connecting to the new node.

Based on the foregoing, there is a clear need for a mechanism for dynamically establishing multipoint VPN networks with encryption.

There is a specific need for a way to set up such networks that can utilize the security offered by IPsec.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for establishing a dynamic multipoint encrypted virtual private network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operating Environment Example

Figure 1:
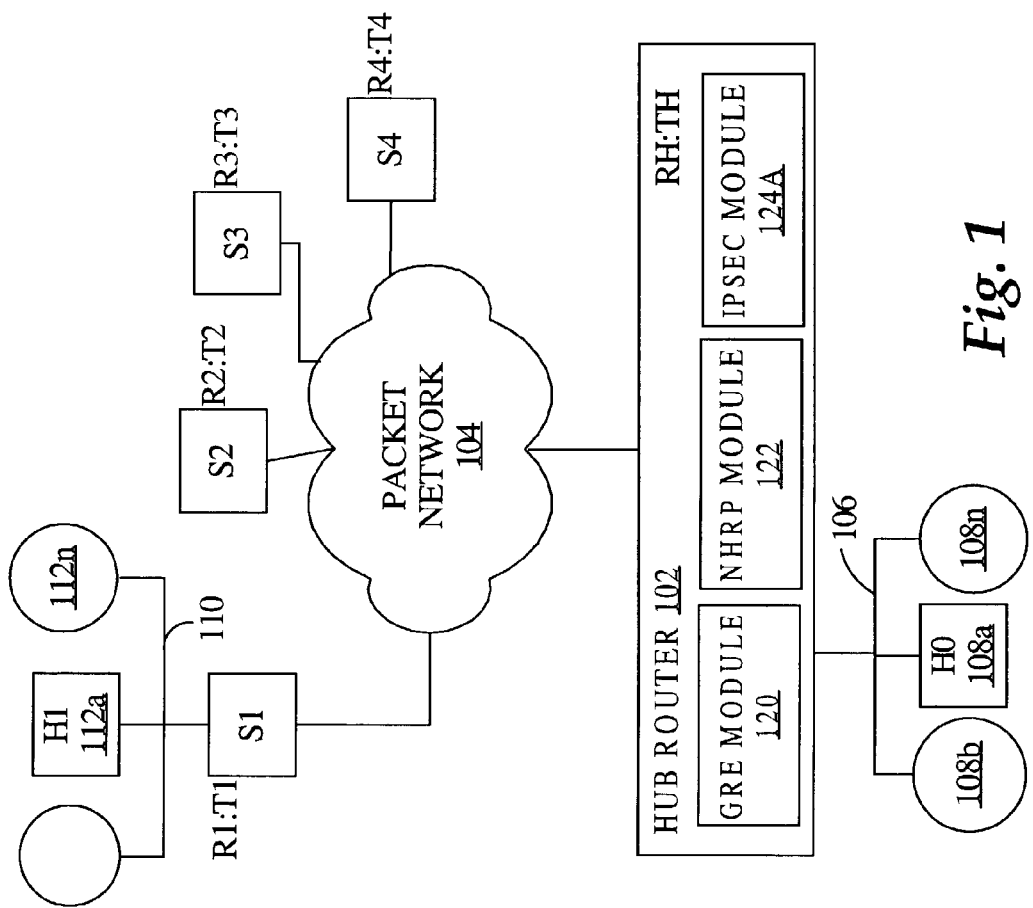
FIG. 1 is a block diagram of an example network in which an embodiment may be implemented.

FIG. 1 is a block diagram of an example network in which an embodiment may be implemented. In FIG. 1, a router 102 is located in the position of hub for a hub-and-spoke arrangement of other routers S1, S2, S3, S4. Because of its logical role as a communications hub in such a system, in this description, router 102 is sometimes termed a hub; however, this terminology is distinct from a hardware hub as known in the networking field for interconnecting end stations, as in an Ethernet hub.

Hub router 102 is communicatively coupled to a packet-switched network 104 that may contain any number of network infrastructure elements including routers, switches, gateways, etc. Such elements are omitted from FIG. 1 for clarity, because they are not pertinent to the embodiments described herein. In one embodiment, network 104 is a TCP/IP network in which infrastructure elements execute a conventional routing protocol, such as RIP, EIGRP, OSPF, BGP, etc., for routing packets among the infrastructure elements. Hub router 102 also is communicatively coupled to a local area network 106 from and to which the hub router receives and routes data packets, respectively. LAN 106 comprises one or more hosts 108a, 108b, 108n. A first host 108a is also designated in this description as host H0.

The other routers S1, S2, S3, S4 also are communicatively coupled to network 104. Each of the other routers S1, S2, S3, S4 also may route data packets to a local area network, or to other network infrastructure elements. As an example, router S1 receives and routes from and to LAN 110 having hosts 112a, 112n. Host 112a is also referred to herein as host H1.

Further, each of the other routers S1, S2, S3, S4 is identified by a routable network address R1, R2, R3, R4, respectively. The designation "R" in R1, R2, R3, R4 is used to signify that such addresses are routable and "real," as opposed to virtual. Addresses R1, R2, R3, R4 are IP addresses, and may be dynamically assigned. For example, routers S1, S2, S3, S4 may communicate with address servers that conform to Dynamic Host Control Protocol (DHCP) and that assign a dynamic network address R1, R2, R3, R4 to the routers when they power-up or initialize. Although embodiments are described herein with reference to IP addresses and the IP protocol, implementations are not limited to use of IP. Rather, other packet-based protocols, even protocols that are not yet developed, are specifically contemplated.

Hub router 102 further comprises a GRE module 120, NHRP module 122, and IPsec module 124A. Each such module comprises one or more computer programs or other software elements for implementing the functions described further herein. Modules 120, 122, 124A may form components of an operating system for hub router 102. Each of the spoke routers S1, S2, S3, S4 are similarly configured with a GRE module 120, NHRP module 122, and IPsec module 124A.

For purposes of illustrating a clear example, limited numbers of routers, LANs, and hosts are shown in FIG. 1. However, in a practical embodiment, there may be any number of such elements, and the use of hundreds or thousands of routers is specifically contemplated.

The hub router 102 participates in a point-to-multipoint (i.e., "multipoint") Generic Routing Encapsulation (GRE) tunnel with routers S1, S2, S3, S4. A protocol for establishing GRE tunnels is described in IETF Request for Comments (RFC) 1701. Thus, in an embodiment, GRE module 120, which implements the functions and protocols of RFC 1701, is used to set up a multipoint GRE tunnel having one endpoint at a logical GRE interface in hub router 102, and multiple other endpoints at logical GRE interfaces of routers S1, S2, S3, S4. In this arrangement, the GRE tunnel interface at router 102 has a static virtual tunnel IP address of TH, and the GRE tunnel interfaces of routers S1, S2, S3, S4 have static virtual tunnel IP addresses of T1, T2, T3, T4, respectively, which are not conventionally routable over a public network. Use of a point-to-multipoint tunnel allows for a single tunnel interface on each router 102, S1, S2, S3, S4, rather than an interface for each point-to-point link in a point-to-point tunnel network. Hence, configuration information associated with and residing on each router is minimized. Furthermore, each tunnel interface can have any number of destinations configured or dynamically learned thereon.

Typically, tunnel addresses T1, T2, T3, T4, which are associated with routers S1, S2, S3, S4 of the virtual private network, are selected in an address range that places the addresses within the same subnet. Techniques are well-known in the art for assigning addresses to network devices such that they appear on the same subnet. Thus, the address TH of hub router 102 appears to be one hop away from address T1, even though multiple real infrastructure elements of network 104 may be interposed among the hub router 102 and endpoint router S1. The GRE tunnel may be established by providing appropriate GRE tunnel configuration commands to routers 102, S1, S2, S3, S4, which commands are interpreted by a configuration interpreter and executed by respective GRE modules 120.

NHRP module 122 of hub router 102 enables hub router 102 to resolve "non-routable" virtual tunnel addresses into real routable addresses so that infrastructure elements in network 104 can route packets to a tunnel endpoint. However, the real address of a tunnel endpoint may be assigned dynamically when an endpoint device initializes, with the exception of the hub router 102, which typically is configured with a static real address. Therefore, to facilitate such address resolution, upon power-up or initialization, routers S1, S2, S3, S4 register with hub router 102, which serves as a next hop server (NHS), and provide their real addresses and information about networks to which they can route packets. Such network information is typically provided by running a dynamic routing protocol over the VPN network. Hub router 102 stores the real addresses in a mapping of virtual tunnel addresses to real addresses, and stores the network information in a similar mapping, such as a routing table.

For example, assume that router S1 initializes and determines from its configuration information that NHRP is enabled thereon. In response, NHRP module 122 of router S1 sends an NHRP registration packet to hub router 102 that contains the real address R1 and tunnel virtual address T1 of S1. NHRP module 122 of hub router 102 stores R1 in a mapping that associates real address R1 to virtual tunnel address T1. Use of this arrangement enables hub router 102 to forward packets from one host to another host across a multipoint GRE ("mGRE") tunnel.

For example, assume that one host, such as H0, generates IP packets that are directed to host H1, and therefore have a source IP address value of H0 and a destination IP address value of H1. The packets arrive from LAN 106 at hub router 102. Hub router 102 looks up host H1 in a routing table and determines that host H1 is associated with a tunnel endpoint having virtual tunnel address T1.

Address T1 is a virtual address that is not routable by infrastructure elements in network 104, and therefore hub router 102 requests NHRP module 122 to resolve the virtual tunnel address. As a result, real routable address R1 is identified in association with virtual address T1. Hub router 102 encapsulates the packets from host H0 in a GRE header, and adds a new IP header having a source address of RH and a destination address of R1. Hub router 102 forwards the modified packet to network 104. The modified packet is structured as follows, with real source and destination IP addresses (RH and R1), a GRE header, and encapsulated IP host addresses (H0 and H1).

| IP S:RH D:R1 | GRE | IP S:H0 D:H1 |

The packet is routed through network 104 to arrive at real address R1 of router S1, which detects the GRE header in the packet. Router S1 drops the new IP header (i.e., IP S:RH D:R1) and consults the encapsulated original IP header to identify the destination address (i.e., IP S:H0 D:H1) of H1. Router S1 then routes the packet to host H1 via LAN 110. Note that both hosts and host addresses are referred to similarly, as in host H1 has an associated address H1.

According to an embodiment, hub router 102 and the other routers S1, S2, S3, S4 can communicate encrypted data traffic on the multipoint GRE tunnel using the IPsec protocol by communicating certain messages and information among NHRP module 122 and IPsec module 124A.

Router Functional Components

Figure 2:
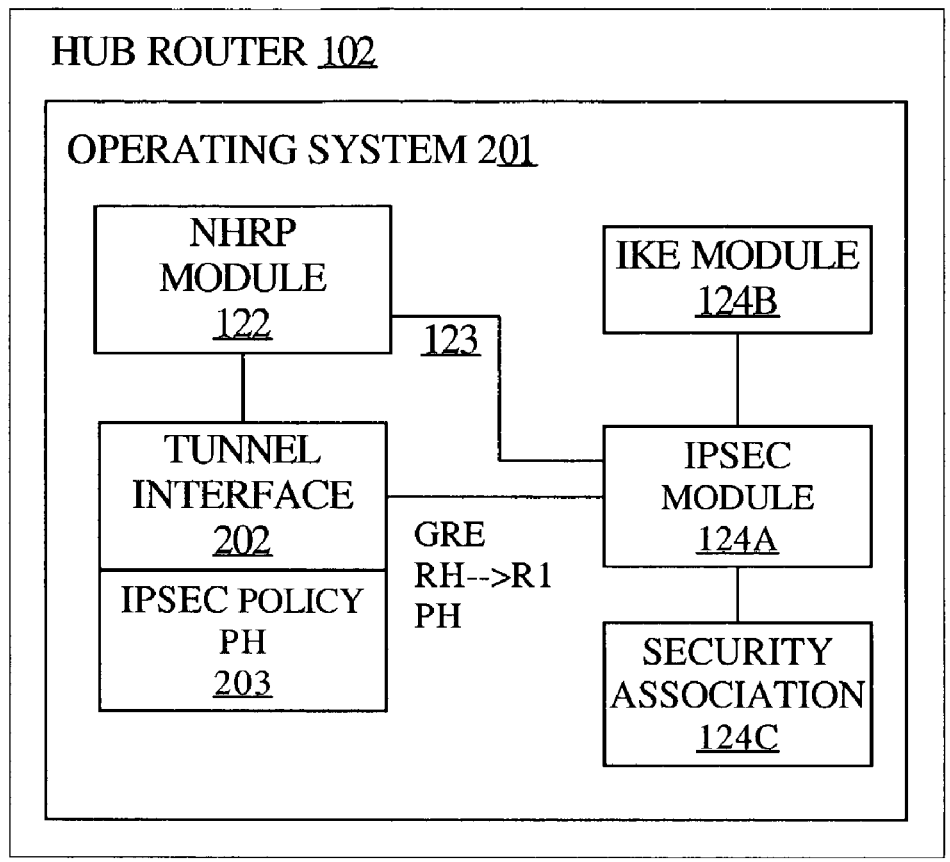
FIG. 2 is a block diagram of a hub router illustrating elements involved in communicating data on multipoint tunnels using IPsec encryption.

FIG. 2 is a block diagram of a hub router illustrating elements involved in communicating data on multipoint tunnels using IPsec encryption. Other routers configured with the hub router in a hub-and-spoke network architecture, for example, spoke routers S1, S2, S3, S4 (FIG. 1), are configured similarly to the hub router, as depicted in FIG. 2. However, in certain embodiments, the functionality of the hub and spoke routers is different. For example, in one embodiment, the hub router is designated as the next hop server for the spoke routers, thereby facilitating the resolution and mapping of associations between public and private network addresses. In that context, the hub router functions as a server and the spoke routers function as associated clients.

In the example of FIG. 2, hub router 102 executes an operating system 201 that includes NHRP module 122 and IPsec module 124A. Note that implementations are not limited to a configuration as depicted in FIG. 2. For example, NHRP module 122 and IPsec module 124A are not limited to being an operating system 201 function, but may be installed and configured separately from the operating system. NHRP module 122 and IPsec module 124A have a direct programmatic or messaging connection, as indicated by line 123. Using connection 123, as described below, NHRP module 122 can inform IPsec module 124A when mappings of virtual tunnel addresses to real addresses are created or deleted. Alternatively, in an embodiment, tunnel interface 202 can inform IPsec module 124A when address mappings are created or deleted. Operating system 201 also instantiates and manages, as a data structure or other logical construct, a tunnel interface 202 that represents an endpoint of a GRE tunnel having virtual address TH. In the course of operations and as depicted in FIG. 2, tunnel interface 202 communicates a message to IPsec module 124A that includes VPN tunnel information, real routable address information, and encryption policy information (e.g., GRE; RH:R1; PH, as depicted).

Further, IPsec module 124A is coupled to an Internet Key Exchange (IKE) module 124B. In the course of operations, as described further below, IPsec module 124A may create and manage one or more security associations with other end points, such as a security association 124C, for tunnel interface 202 associated with tunnel address TH and a tunnel interface at router S1 associated with tunnel address T1. In one embodiment, IPsec module 124A and IKE module 124B implement the functions and protocols described in IETF RFC 2401 to RFC 2411, inclusive.

Processes for Dynamically Establishing a Secure VPN

Figure 3:
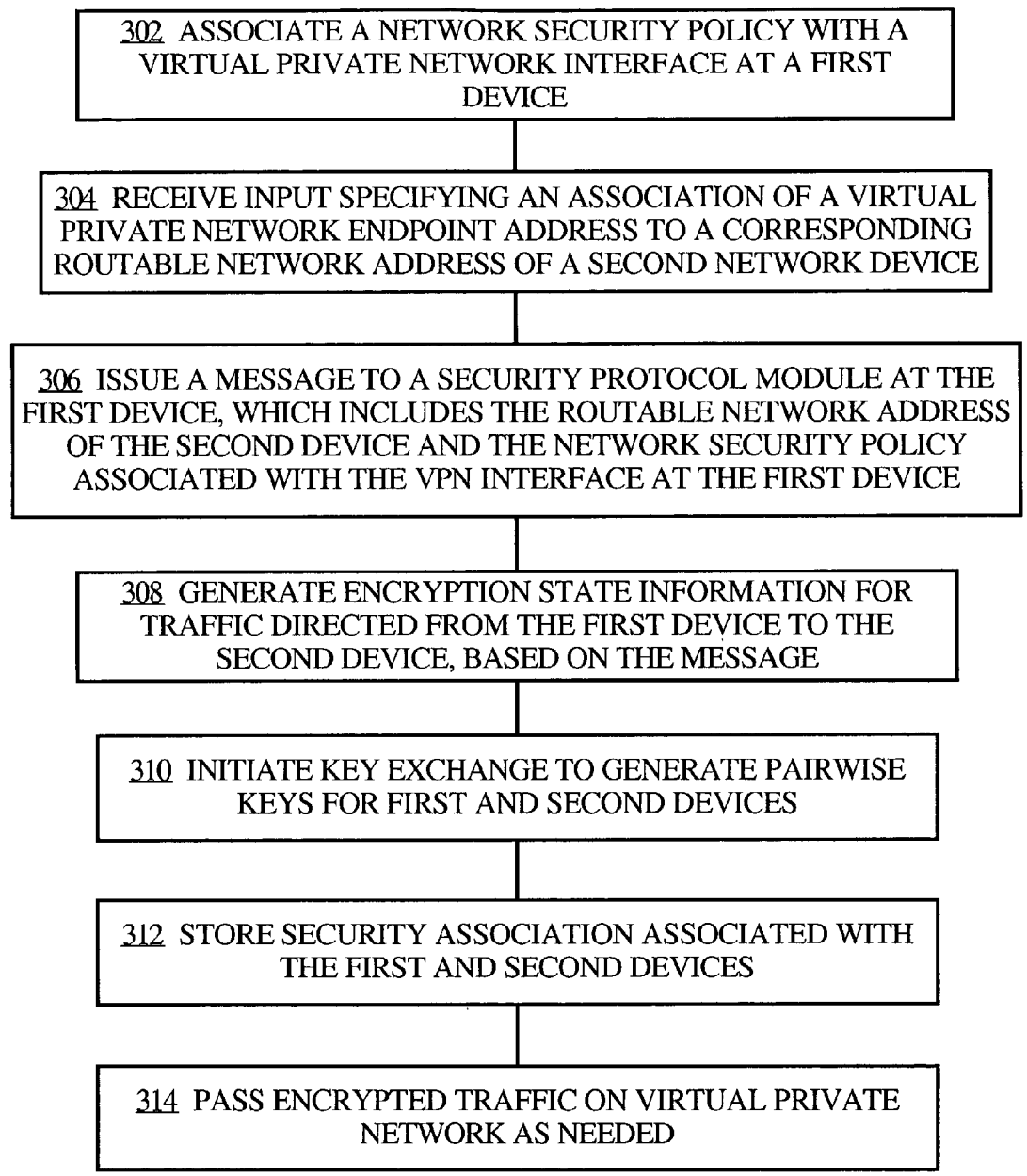
FIG. 3 is a flow diagram illustrating a high-level view of a process for establishing and using dynamic multipoint encrypted virtual private networks.

FIG. 3 is a flow diagram illustrating a high-level view of a process for establishing and using dynamic multipoint encrypted virtual private networks, according to an embodiment. For purposes of illustrating a clear example, the method of FIG. 3 is described with reference to FIG. 1 and FIG. 2. However, embodiments are not limited to the context of FIG. 1 and FIG. 2.

At block 302 a network security policy, such as an IPsec policy, is associated with a virtual private network tunnel interface at a first network device, such as hub router 102 or spoke router S1 of FIG. 1. In this context, "IPsec policy" refers to associated information, which may be encapsulated in an IPsec policy data structure, that specifies one or more encryption parameters and related metadata. For example, an IPsec policy may comprise values indicating that the encryption methodology is DES, IPsec transport mode is used, specific key lifetime values, etc. These values are typically established in a static configuration step as part of a router configuration. Each router may have a different IPsec policy for each of its interfaces. As an example, FIG. 2 illustrates IPsec policy PH 203, which is associated with tunnel interface 202. Thus, for example, block 302 involves associating information with tunnel interface 202 that instructs tunnel interface 202 to perform IPsec encryption using policy PH when GRE traffic is sent from the tunnel interface 202.

At block 304, input specifying a new association of a VPN endpoint address to a corresponding real routable address of a second network device, such as spoke router S1 or S2, is received. In one embodiment, such input is received at tunnel interface 202 (FIG. 2) when NHRP module 122 (FIG. 2) generates a new mapping of a GRE tunnel address for a destination spoke router, such as T2, to a corresponding real routable address R2 for the destination spoke router. Such input may be received either at a spoke router or a hub router. Further, the input may be transmitted and received in response to a spoke router sending a resolution request message to the hub router acting as next-hop server (NHS), in the form of a resolution reply message. This activity may occur, for example, when one spoke router, such as router S1, wants to communicate with another spoke router, such as router S2. Alternatively, such input may occur when a hub router, such as hub router 102 (FIG. 1), receives a registration request from a spoke router, such as router S1, and consequently performs an address resolution and generates an address mapping. For example, this activity may occur upon initialization activity as part of a power up sequence for the spoke router.

An mGRE tunnel between a given spoke router and the hub router can be established upon power-up of the spoke router, so that subsequent NHRP resolution traffic is IPsec encrypted. For example, router S1 is aware of its real address R1 and the static hub real address RH. Thus, upon power-up and establishment of the VPN tunnel interface on S1, a IPsec module 124A listener socket at S1 is created, S1 registers with the hub router 102 (FIG. 1) as NHS, thus triggering a T1:R1 mapping and reception thereof at S1. Consequently, an IPsec state between S1 and hub router 102 is established, as described further below. Hence, subsequent network traffic transmitted between S1 and the hub router 102, including NHRP registration and/or resolution messages, are protected through IPsec encryption.

The real IP address of spoke router S1 is sent to hub router 102 in NHRP registration packets, which is used to create the T1:R1 mapping for S1. Consequently, spoke routers' real addresses can dynamically change (e.g., due to a reboot or reconnect to the network), and a new address mapping and IPsec state will automatically be generated. Further, once hub router 102 (FIG. 1) receives a NHRP registration from a given spoke router, the hub router 102 enters unicast and multicast NHRP mappings for the given spoke router. The unicast mapping is used when sending IP unicast packets over the VPN tunnel and the multicast mapping is used when sending multicast packets over the tunnel, most notably for the dynamic routing protocol packets (e.g., RIP, EIGRP or OSPF).

This process is repeated as each spoke router powers up. Thus, the hub-and-spoke part of the VPN network, although built dynamically, will stay up all the time since the network paths are used for propagation of dynamic routing information from spoke routers S1, S2, S3, S4 to the hub router 102 (FIG. 1) and back out to spoke routers.

Typically, for hub routers, there is a block of configuration code that defines the crypto map characteristics for each spoke router. The characteristics code includes "set peer . . ." commands for each peer router. In an embodiment in which IPsec is running in transport mode, IPsec peer addresses must match the IP destination address on each packet to be encrypted, which is the GRE tunnel address. Thus, for example, for purposes of negotiating a security association, the IPsec module 124A (FIG. 2) can obtain the appropriate peer address from the GRE tunnel interface or NHRP rather than requiring specification in the configuration code. Consequently, the number of lines of configuration code on a hub router is significantly reduced, in relation to prior approaches. This approach also reduces the configuration on a spoke router, but to a lesser degree.

The above dynamic hub-and-spoke network facilitates the dynamic creation of direct dynamic spoke-to-spoke tunnels. This allows for the forwarding of spoke-to-spoke data packets directly between spokes without having to manually setup a full-mesh VPN network. For an example, assume that the embodiment of FIG. 3 is used when a first spoke router S1 ("spoke1") is dynamically establishing a direct encrypted mGRE tunnel to a second spoke router S2 ("spoke2"). Assume also that there is traffic destined from host H1 behind S1 to host H2 behind S2. S1 knows, possibly from a dynamic routing protocol, that to route to S2 it is supposed to send packets to VPN tunnel address T2, but S1 does not have an NHRP mapping for T2. That is, S1 does not know the real routable address R2 of S2, only the VPN tunnel address T2. Therefore, it sends an NHRP resolution request to its NHS. As described above, hub router 102 may function as the NHS. Regardless, upon S1 receiving the NHRP resolution reply from its associated NHS, S1 will create an internal NHRP mapping for

<T2>==><R2>;

that is, a T2:R2 mapping.

The creation of the NHRP mapping for T2 will trigger IPsec module 124A of S1 to set up state with S2. Specifically, in response to the input received at block 304, at block 306 the tunnel interface 202 (FIG. 2) of source router S1 sends a message to its associated IPsec module 124A (FIG. 1), requesting it to generate new encryption state information with destination router S2, as depicted at block 308. In the message, the tunnel interface 202 also provides at least the real IP addresses of the tunnel endpoints, such as R1 and R2, and the IPsec policy, such as policy P1 similar to policy PH on hub router 102.

At block 308, new encryption state information is generated for use in encrypting traffic directed from the first or source network device, such as spoke router S1, to the second or destination network device, such as spoke router S2. The encryption state is represented as a data structure or other logical construct, which specifies parameters used to encrypt and transmit packets between the tunnel endpoints. The encryption state information includes, for example, routable network address information, VPN encapsulation protocol (e.g., GRE) information, and security policy information. In one embodiment, block 308 is triggered when a listener socket connection of IPsec module 124A (FIG. 2) for a given router receives the foregoing message of block 306 from its associated tunnel interface 202 (FIG. 2). Further, the IPsec module 124A listener socket for a given router may be automatically created upon initialization of the tunnel interface 202 for that router.

Block 310 is described for an embodiment in which IPsec is used to secure a GRE or other VPN tunnel. A similar step, with respect to secure association establishment and key exchange, could be performed utilizing appropriate protocols in implementations that do not use the IPsec protocol.

At block 310, IPsec module 124A (FIG. 2) of the source router S1 initiates a communication with the destination spoke router S2, utilizing an appropriate protocol such as ISAKMP (Internet Security Association and Key Management Protocol) to perform a key exchange such as IKE. As a result, the source spoke router authenticates itself to the destination spoke router, exchanges encryption key information and negotiates encryption parameters. As a result of block 310, pairwise keys are generated for use in encrypting traffic among the pertinent spoke routers S1, S2.

At this point in the process, the source router S1 can transmit encrypted IP packets encapsulated in a GRE tunnel directly to the destination router S2. Upon receiving the first packet from S1 at S2, S2 initiates a similar process with respect to address resolution for S1, so that it knows to where a return packet should be transmitted. Further, an encryption state associated with the two spoke routers has already been established, therefore return data packets to the source spoke router can be encapsulated and encrypted from the destination spoke router to the source spoke router. Due to the ability to dynamically build spoke-to-spoke links, load on an associated hub router, as well as network latency, is reduced.

If the networks change on either side of the encrypted VPN tunnel, the other side will dynamically learn of the change through NHRP registration and mapping propagation and through propagation of dynamic routing information. Thus, encrypted connectivity will be established without any router configuration changes.

The procedure described with respect to blocks 302-310 may also be used when the originating or source node is a hub router and the destination node is a spoke router.

Assume, for purposes of illustrating an example with reference to FIG. 1, that an IPsec policy PH is created for use when GRE traffic is routed from hub router 102 (FIG. 1) at real address RH to router S1 at real address R1. Whether initiated by a spoke-to-spoke communication or a hub-to-spoke communication, at block 312 an IPsec security association ("SA") is stored. In one embodiment, the security association is passed from IPsec module 124A to tunnel interface 202. The SA associates policy PH with traffic-identifying information. Thus, for example, an SA 124C may indicate that policy PH is used when traffic has a source address of RH, a destination address of R1, and a protocol of GRE. The SA also typically includes the keys that were generated at block 310 and a security parameter index (SPI) value, which is used as an identifier.

At block 314, encrypted traffic is passed on the VPN tunnel from the first device to the second device, based on the encryption state generated at block 308. For example, when tunnel interface 202 (FIG. 2) of hub router 102 receives data packets for forwarding on the tunnel to spoke router S1 (e.g., a packet from H0 destined to H1), the tunnel interface 202 invokes the associated IPsec module 124A (FIG. 2), which determines that security association 124C (FIG. 2) specifies how to encrypt the traffic. In turn, IPsec module 124A encrypts the traffic according to the SA 124C, and passes the packets to the real interface RH of the hub router 102 (FIG. 1) out through the tunnel to the real address R1 of destination router S1, whereby it is routed to the final destination H1.

The process described dynamically establishes a secure VPN by generating an encryption state for network traffic over a VPN link in response to notification of a virtual address-to-real address mapping. It is further dynamic with respect to spoke-to-spoke VPN links, in that network traffic between two spokes can trigger generation of an encryption state and a security association among the two spokes, via NHRP resolution requests and replies between spoke routers and their associated NHS. Therefore, significantly, a statically configured full mesh network is unnecessary. Note that hub-to-spoke links are normally more lasting than spoke-to-spoke links due to the repetitive dynamic routing protocol traffic and NHRP registration and resolution traffic between a hub router and its related spoke routers.

An encrypted packet, according to the techniques described herein, is structured as follows, with real source and destination IP addresses (RH and R1), a conventional transport mode IPsec ESP (Encapsulating Security Payload) header, a GRE header, and encapsulated IP host addresses (H0 and H1).

| IP S:RH D:R1 | ESP | GRE | IP S:H0 D:H1 |

IPsec does not readily support IP multicast traffic. Further, dynamic routing protocols typically use IP multicast traffic to communicate among network devices for dynamic routing purposes. Significantly, utilizing the techniques described herein, an IP multicast packet can be encapsulated into an IP unicast GRE packet, which can be encrypted using IPsec. Thus, the capability is provided for using IPsec with multicast traffic and, therefore, for using dynamic routing protocols. Consequently, dynamic discovery of network destinations over a VPN is facilitated.

Furthermore, in an implementation that utilizes a dynamic routing protocol, when the hub router 102 (FIG. 1) reflects routes advertised from one spoke router out to the other spoke routers, the hub router 102 may set the next-hop for such routes to another spoke router. That is, the hub uses the originating spoke router rather than itself as the next-hop for the route. Thus, spoke routers can route traffic directly to another spoke router rather than through the hub router.

In an alternative embodiment, an IPsec interface configured in IPsec tunnel mode is used in addition to encapsulation of a GRE tunnel. Thus, IPsec is used to implement both encryption and encapsulation functionality. This is useful, for example, when there are network modules in packet network 104 (FIG. 1) that will do Network Address Translation (NAT) of the IP header of the IPsec packets, which could break the IPsec transport mode tunnel and thus break the VPN network.

In an alternative approach, IPsec-related operations (steps 308-314 of FIG. 3) may be triggered by initialization of the mGRE interface of a spoke router, such as router S1, rather than upon reception of an address mapping. For example, assume that a spoke router is powered up. On the spoke router, in its VPN tunnel configuration, are the CLI commands:

ip nhrp map <TH> <RH>
    ip nhrp nhs <TH>

The spoke router configuration is parsed, and the first command above causes creation of a static NHRP mapping entry of the hub tunnel address to the hub real routable address, at the spoke router. When the NHRP mapping entry is created, the IPsec module 124A (FIG. 2) of the spoke router S1 is triggered to create an IPsec state with the hub router 102.

The second command above instructs the NHRP module 122 (FIG. 1) of the spoke router that the hub router 102 (FIG. 1) is its next-hop-server. This instruction causes NHRP module 122 of the spoke router to send NHRP registration packets to the hub router 102, as the NHS. This will use the NHRP mapping entry above to actually send the tunnel packet to the router (hub) associated with RH.

Hence, in this approach, initiation of IPsec operations may occur when a configuration interpreter executes a configuration command at a spoke router, which sets an NHRP mapping for the hub router and sets the hub as the NHS for the spoke. Consequently, NHRP is not used as a signaling protocol to aid in establishment of a VPN tunnel. Contrastly, NHRP is used for network address resolution, which predominately occurs within a VPN tunnel (e.g., a GRE tunnel) that is already established, and subsequently, as a trigger mechanism for IPsec state generation for traffic through the tunnel. Hence, NHRP resolution traffic can be exchanged through the tunnel rather than in the clear.

In yet another alternative approach, steps 304 to 314 of FIG. 3 may be performed in an embodiment that operates with a point-to-point tunnel in which NHRP is not used. In this alternative, a peer router is manually configured on the tunnel interface of a given router. For example, router S2 is manually configured with VPN tunnel address information associated with router S1. In response, the tunnel interface 202 (FIG. 2) at router S2 creates a message based on information known to it from its router configuration, such as its real IP address R2, the peer router real IP address R1, IPsec policy, etc. The tunnel interface 202 at router S2 sends the message to its associated IPsec module 124A (FIG. 2). The IPsec module 124A receives this message and creates the encryption state information with respect to the peer router, in a manner as described above in reference to block 308.

Although certain embodiments have been illustrated in the context of IPsec encryption, the invention is not limited to that context. Further, mechanisms other than NHRP alone may be used to resolve addresses of remote routers. For example, Tunnel Endpoint Detection ("TED") protocol may be used in combination with NHRP module 122 (FIG. 2) and multipoint GRE tunnels as described herein in order to obtain one or more remote router addresses, and to communicate such addresses to IPsec module 124A (FIG. 2).

Examples of configuration commands and routing table information for hub and spoke routers in a static hub-and-spoke network with tunnel protection, using point-to-point GRE (p-pGRE) tunnels, are presented in Appendix A.

Further, examples of configuration commands for a hub router and a spoke router, using mGRE on the hub and p-pGRE on the spoke, are presented in Appendix B. Note that the IP addresses of the spoke routers are not configured on the hub router configuration, for the real routable addresses and the tunnel address to real address mappings are learned via NHRP. The hub router real address is configured on spoke routers, since they initiate the IPsec GRE tunnel.

Still further, examples of configuration commands and routing tables for a hub router and two spoke routers for a dynamic multipoint network, using mGRE on both hub and spoke routers, are presented in Appendix C. Further, on the spoke router, the configuration line ip nhrp map multicast <RH> is used so that IP routing protocol packets, which are typically multicast in a dynamic routing protocol context, will be mapped and transmitted to the hub router. This is performed since the GRE tunnels on the spokes are now multipoint interfaces. Also note the presence of some EIGRP commands under the tunnel interface of the hub to control EIGRP. For example, two significant commands on the hub router tunnel interface are no ip split-horizon eigrp 1,
    no ip next-hop-self eigrp 1, which allow EIGRP on the hub router to advertise routes learned from one spoke router to other spoke routers, with the original spoke router as the next hop. This sets up the routing tables on the spoke routers to trigger direct dynamic tunnels for spoke-to-spoke traffic. Other dynamic routing protocols could be used and configured to provide the same functionality.

Embodiments herein provide for enhanced scalability in full mesh or partial mesh IPsec VPNs. Embodiments are especially useful when spoke-to-spoke traffic is sporadic (i.e., every spoke is not constantly sending data to every other spoke). Any spoke may send data directly to any other spoke, as long there is direct IP connectivity between the spokes.

In prior approaches to full mesh networks, all point-to-point IPsec (or IPsec+GRE) tunnels must be configured on all the routers in the mesh network, even if some or most of these tunnels are not running or needed at all times. Utilizing an embodiment described herein, one router is designated the "hub", and all the other routers ("spokes") are configured with tunnels to the hub. The spoke-to-hub tunnels are up continuously. However, the spoke routers do not have nor need configuration for tunnels to any of the other spoke routers. Instead, when a spoke router wants to transmit a packet to the subnet behind another spoke router, it uses NHRP to dynamically determine the required destination address of the target router. The hub router acts as the NHRP server and handles this request for the source router. The two spokes then dynamically create an IPsec tunnel between them (via the single mGRE interface) and data can be directly transferred.

An idle or other timeout function will automatically tear down the encrypted VPN tunnel after a period of inactivity. In an embodiment, the timeout function is triggered by an NHRP mapping timeout, wherein the tunnel interface becomes aware of the NHRP timeout and notifies the IPsec module, which in turn deletes its state information/data structure relative to the particular tunnel.

Furthermore, multiple hub routers can be implemented in the network, each supporting a large number of spokes. The hubs in this "partial temporal mesh" could be interconnected using a mesh of permanent GRE+IPsec tunnels, local LAN interfaces (if the hubs are co-located), or these hubs could serve as spokes for another tier of hub routers to create a multiple tier hub-and-spoke VPN network.

Embodiments herein support IPsec nodes with dynamically assigned addresses (e.g. Cable, ISDN, DSL). This applies to hub-and-spoke as well as mesh networks. Consequently, the cost of provisioning spoke routers to an underlying network is reduced due to the lower costs associated with dynamic addresses than with static addresses.

Embodiments herein simplify the addition of VPN nodes. When adding a new spoke router, only the spoke router is configured and plugged into the network, and possibly ISAKMP authorization information for the new spoke is added at the hub router. The hub router will dynamically learn about the new spoke router and the dynamic routing protocol will propagate routing paths to the hub and all other spokes.

Embodiments herein significantly reduce the size of the configuration needed on all the routers in the VPN. This is also the case for GRE+IPsec hub-and-spoke only VPN networks.

Embodiments herein support IP multicast and dynamic routing traffic across the VPN through utilization of GRE, which encapsulates the IP multicast packets into IP unicast tunnel packets. Hence, a dynamic routing protocol can be used, and redundant "hubs" can be supported by the protocol. Multicast applications are also supported.

Embodiments herein support split tunneling at the spokes. Furthermore, Embodiments herein support CEF (Cisco's Express Forwarding) and other fast switching techniques. The mGRE/NHRP solution can CEF switch the mGRE traffic, resulting in much better performance than with typical process switching in mGRE interfaces.

Implementation Mechanisms—Hardware Overview

Figure 4:
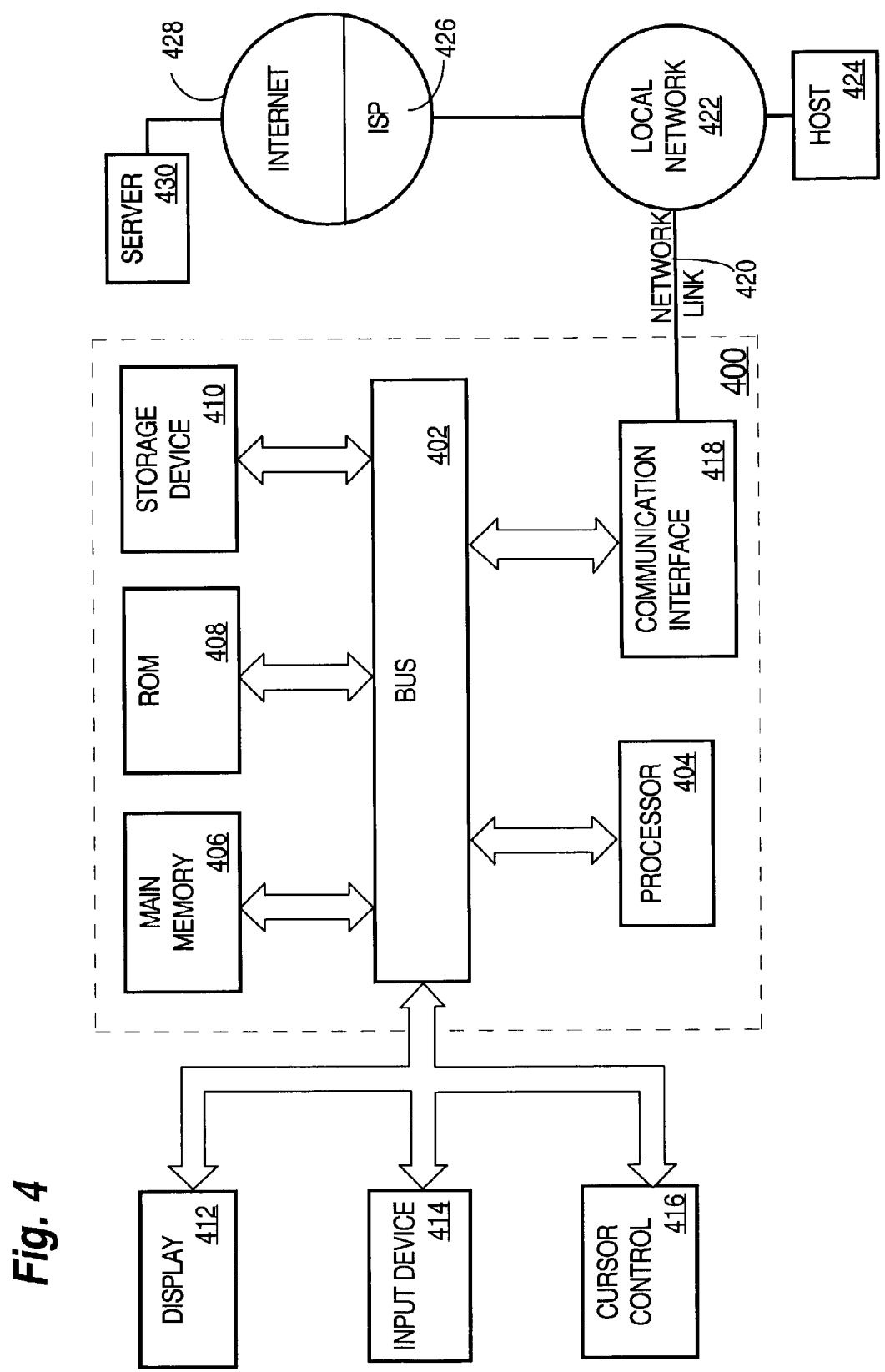
FIG. 4 is a block diagram that illustrates a computer system upon which an embodiment may be implemented.

FIG. 4 is a block diagram that illustrates a computer system 400 upon which an embodiment of the invention may be implemented. Embodiments are implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for establishing a dynamic multipoint encrypted virtual private network. According to one embodiment of the invention, a multipoint IPsec VPN is established by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for establishing a dynamic multipoint encrypted virtual private network as described herein.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

---

APPENDIX A

Hub Router Configuration:

```
crypto isakmp policy 1
 authentication pre-share
 crypto isakmp key cisco471 address <ip-spoke1>
 crypto isakmp key cisco472 address <ip-spoke2>
!
crypto ipsec transform-set trans2 esp-des esp-md5-hmac
 mode transport
!
crypto ipsec profile vpnprof
 set transform set trans2
!
interface Tunnel0
 ip address 10.0.1.1 255.255.255.252
 tunnel source Ethernet0
 tunnel destination <ip-spoke1>
 tunnel protection ipsec profile vpnprof
!
interface Tunnel1
 ip address 10.0.1.5 255.255.255.252
 tunnel source Ethernet0
 tunnel destination <ip-spoke2>
 tunnel protection ipsec profile vpnprof
!
interface Ethernet0
 ip address <ip-hub> 255.255.255.0
!
interface Ethernet1
 ip address 10.1.0.1 255.255.255.0
!
router eigrp 1
 network 10.0.0.0
```

Spoke1 Router Configuration:

```
crypto isakmp policy 1
 authentication pre-share
 crypto isakmp key cisco471 address <ip-hub>
!
crypto ipsec transform-set trans2 esp-des esp-md5-hmac
 mode transport
!
crypto ipsec profile vpnprof
 set transform-set trans2
!
interface Tunnel0
 ip address 10.0.1.2 255.255.255.252
 tunnel source Ethernet0
 tunnel destination <ip-hub>
 tunnel protection ipsec profile vpnprof
!
interface Ethernet0
 ip address <ip-spoke1> 255.255.255.0
!
interface Ethernet1
 ip address 10.1.1.1 255.255.255.0
!
router eigrp 1
 network 10.0.0.0
```

Spoke2 Router Configuration:

```
crypto isakmp policy 1
 authentication pre-share
 crypto isakmp key cisco472 address <ip-hub>
!
crypto ipsec transform-set trans2 esp-des esp-md5-hmac
 mode transport
!
crypto ipsec profile vpnprof
 set transform-set trans2
!
interface Tunnel0
```

-continued

APPENDIX A

```
  ip address 10.0.1.6 255.255.255.252
  tunnel source Ethernet0
  tunnel destination <ip-hub>
  tunnel protection ipsec profile vpnprof
!
interface Ethernet0
  ip address <ip-spoke2> 255.255.255.0
!
interface Ethernet1
  ip address 10.1.2.1 255.255.255.0
!
router eigrp 1
  network 10.0.0.0
Hub Router Routing Table:

10.0.0.0/8 is variably subnetted, 5 subnets, 2 masks
C    10.0.1.0/30 is directly connected, Tunnel0
C    10.0.1.4/30 is directly connected, Tunnel1
C    10.1.0.0/24 is directly connected, Ethernet0
D    10.1.1.0/24 [90/297270016] via 10.0.1.2, 07:32:04, Tunnel0
D    10.1.2.0/24 [90/297270016] via 10.0.1.6, 07:32:08, Tunnel1
C    <ip-hub>/24 is directly connected, Ethernet1
Spoke1 Router Routing Table:

10.0.0.0/8 is variably subnetted, 5 subnets, 2 masks
C    10.0.1.0/30 is directly connected, Tunnel0
D    10.0.1.4/30 [90/297270016] via 10.0.1.1, 07:32:02, Tunnel0
D    10.1.0.0/24 [90/297270016] via 10.0.1.1, 07:32:04, Tunnel0
C    10.1.1.0/24 is directly connected, Ethernet0
D    10.1.2.0/24 [90/310070016] via 10.0.1.1, 07:39:25, Tunnel0
C    <ip-spoke1>/24 is directly connected, Ethernet1
Spoke2 Router Routing Table:

10.0.0.0/8 is variably subnetted, 5 subnets, 2 masks
D    10.0.1.0/30 [90/297270016] via 10.0.1.5, 07:32:02, Tunnel0
C    10.0.1.4/30 is directly connected, Tunnel0
D    10.1.0.0/24 [90/297270016] via 10.0.1.5, 07:32:04, Tunnel0
D    10.1.1.0/24 [90/310070016] via 10.0.1.5, 07:39:25, Tunnel0
C    10.1.2.0/24 is directly connected, Ethernet0
C    <ip-spoke2>/24 is directly connected, Ethernet1
```

APPENDIX B

```
Hub Router Configuration:

crypto isakmp policy 1
  authentication pre-share
crypto isakmp key cisco47 address 0.0.0.0
!
crypto ipsec transform-set trans2 esp-des esp-md5-hmac
  mode transport
!
crypto ipsec profile vpnprof
  set transform-set trans2
!
interface Tunnel0
  ip address 10.0.1.1 255.255.255.0
  ip nhrp authentication testing
  ip nhrp map multicast dynamic
  ip nhrp network-id 1129530191
  ip nhrp holdtime 600
  no ip split-horizon eigrp 1
  tunnel source Ethernet0
  tunnel mode gre multipoint
  tunnel key 1129530191
  tunnel protection ipsec profile vpnprof
!
interface Ethernet0
  ip address <ip-hub> 255.255.255.0
!
interface Ethernet1
  ip address 10.1.0.1 255.255.255.0
```

APPENDIX B

```
!
!
router eigrp 1
  network 10.0.0.0
Spoke1 Router Configuration:

crypto isakmp policy 1
  authentication pre-share
crypto isakmp key cisco47 address 0.0.0.0
!
crypto ipsec transform-set trans2 esp-des esp-md5-hmac
  mode transport
!
crypto ipsec profile vpnprof
  set transform-set trans2
!
interface Tunnel0
  ip address 10.0.1.2 255.255.255.0
  ip nhrp authentication testing
  ip nhrp map 10.0.1.1 <ip-hub>
  ip nhrp network-id 1129530191
  ip nhrp holdtime 600
  ip nhrp nhs 10.0.1.1
  tunnel source Ethernet0
  tunnel destination <ip-hub>
  tunnel key 1129530191
  tunnel protection ipsec profile vpnprof
!
interface Ethernet0
  ip address <ip-spoke1> 255.255.255.0
!
interface Ethernet1
  ip address 10.1.1.1 255.255.255.0
!
router eigrp 1
  network 10.0.0.0
Spoke2 Router Configuration:

crypto isakmp policy 1
  authentication pre-share
crypto isakmp key cisco47 address 0.0.0.0
!
crypto ipsec transform-set trans2 esp-des esp-md5-hmac
  mode transport
!
crypto ipsec profile vpnprof
  set transform-set trans2
!
interface Tunnel0
  ip address 10.0.1.3 255.255.255.0
  ip nhrp authentication testing
  ip nhrp map 10.0.1.1 <ip-hub>
  ip nhrp network-id 1129530191
  ip nhrp holdtime 600
  ip nhrp nhs 10.0.1.1
  tunnel source Ethernet0
  tunnel destination <ip-hub>
  tunnel key 1129530191
  tunnel protection ipsec profile vpnprof
!
interface Ethernet0
  ip address <ip-spoke2> 255.255.255.0
!
interface Ethernet 1
  ip address 10.1.2.1 255.255.255.0
!
router eigrp 1
  network 10.0.0.0
Hub Router Routing Table:

10.0.0.0/8 is variably subnetted, 4 subnets, 1 mask
C    10.0.1.0/24 is directly connected, Tunnel0
C    10.1.0.0/24 is directly connected, Ethernet0
D    10.1.1.0/24 [90/297270016] via 10.0.1.2, 07:32:04, Tunnel0
D    10.1.2.0/24 [90/297270016] via 10.0.1.3, 07:32:08, Tunnel0
C    <ip-hub>/24 is directly connected, Ethernet1
Spoke1 Router Routing Table:
```

-continued

APPENDIX B

```
    10.0.0.0/8 is variably subnetted, 4 subnets, 1 mask
C    10.0.1.0/24 is directly connected, Tunnel0
D    10.1.0.0/24 [90/297270016] via 10.0.1.1, 07:32:04, Tunnel0
C    10.1.1.0/24 is directly connected, Ethernet0
D    10.1.2.0/24 [90/310070016] via 10.0.1.1, 07:39:25, Tunnel0
C    <ip-spoke1>/24 is directly connected, Ethernet1
Spoke2 Router Routing Table:

10.0.0.0/8 is variably subnetted, 4 subnets, 1 mask
C    10.0.1.0/24 is directly connected, Tunnel0
D    10.1.0.0/24 [90/297270016] via 10.0.1.1, 07:32:04, Tunnel0
D    10.1.1.0/24 [90/310070016] via 10.0.1.1, 07:39:25, Tunnel0
C    10.1.2.0/24 is directly connected, Ethernet0
C    <ip-spoke2>/24 is directly connected, Ethernet1
```

APPENDIX C

Hub Router Configuration:

```
crypto isakmp policy 1
 authentication pre-share
crypto isakmp key cisco47 address 0.0.0.0
!
crypto ipsec transform-set trans2 esp-des esp-md5-hmac
 mode transport
!
crypto ipsec profile vpnprof
 set transform-set trans2
!
interface Tunnel0
 ip address 10.0.1.1 255.255.255.0
 ip nhrp authentication testing
 ip nhrp map multicast dynamic
 ip nhrp network-id 1129530191
 ip nhrp holdtime 600
 no ip split-horizon eigrp 1
 no ip next-hop-self eigrp 1
 tunnel source Ethernet0
 tunnel mode gre multipoint
 tunnel key 1129530191
 tunnel protection ipsec profile vpnprof
!
interface Ethernet0
 ip address <ip-hub> 255.255.255.0
!
interface Ethernet1
 ip address 10.1.0.1 255.255.255.0
!
router eigrp 1
 network 10.0.0.0
Spoke1 Router Configuration:

crypto isakmp policy 1
 authentication pre-share
crypto isakmp key cisco47 address 0.0.0.0
!
crypto ipsec transform-set trans2 esp-des esp-md5-hmac
 mode transport
!
crypto ipsec profile vpnprof
 set transform-set trans2
!
interface Tunnel0
 ip address 10.0.1.2 255.255.255.0
 ip nhrp authentication testing
 ip nhrp map multicast <ip-hub>
 ip nhrp map 10.0.1.1 <ip-hub>
 ip nhrp network-id 1129530191
 ip nhrp holdtime 600
 ip nhrp nhs 10.0.1.1
 tunnel source Ethernet0
```

-continued

APPENDIX C

```
 tunnel mode gre multipoint
 tunnel key 1129530191
 tunnel protection ipsec profile vpnprof
!
interface Ethernet0
 ip address <ip-spoke1> 255.255.255.0
!
interface Ethernet1
 ip address 10.1.1.1 255.255.255.0
!
router eigrp 1
 network 10.0.0.0
Spoke2 Router Configuration:

crypto isakmp policy 1
 authentication pre-share
crypto isakmp key cisco47 address 0.0.0.0
!
crypto ipsec transform-set trans2 esp-des esp-md5-hmac
 mode transport
!
crypto ipsec profile vpnprof
 set transform-set trans2
!
interface Tunnel0
 ip address 10.0.1.3 255.255.255.0
 ip nhrp authentication testing
 ip nhrp map multicast <ip-hub>
 ip nhrp map 10.0.1.1 <ip-hub>
 ip nhrp network-id 1129530191
 ip nhrp holdtime 600
 ip nhrp nhs 10.0.1.1
 tunnel source Ethernet0
 tunnel mode gre multipoint
 tunnel key 1129530191
 tunnel protection ipsec profile vpnprof
!
interface Ethernet0
 ip address <ip-spoke2> 255.255.255.0
!
interface Ethernet1
 ip address 10.1.2.1 255.255.255.0
!
router eigrp 1
 network 10.0.0.0
Hub Router Routing Table:

10.0.0.0/8 is variably subnetted, 4 subnets, 1 mask
C    10.0.1.0/24 is directly connected, Tunnel0
C    10.1.0.0/24 is directly connected, Ethernet0
D    10.1.1.0/24 [90/297270016] via 10.0.1.2, 07:32:04, Tunnel0
D    10.1.2.0/24 [90/297270016] via 10.0.1.3, 07:32:08, Tunnel0
C    <ip-hub>/24 is directly connected, Ethernet1
Spoke1 Router Routing Table:

10.0.0.0/8 is variably subnetted, 4 subnets, 1 mask
C    10.0.1.0/24 is directly connected, Tunnel0
D    10.1.0.0/24 [90/297270016] via 10.0.1.1, 07:32:04, Tunnel0
C    10.1.1.0/24 is directly connected, Ethernet0
D    10.1.2.0/24 [90/310070016] via 10.0.1.3, 07:39:25, Tunnel0
C    <ip-spoke1>/24 is directly connected, Ethernet1
Spoke2 Router Routing Table:

10.0.0.0/8 is variably subnetted, 4 subnets, 1 mask
C    10.0.1.0/24 is directly connected, Tunnel0
D    10.1.0.0/24 [90/297270016] via 10.0.1.1, 07:32:04, Tunnel0
D    10.1.1.0/24 [90/310070016] via 10.0.1.2, 07:39:25, Tunnel0
C    10.1.2.0/24 is directly connected, Ethernet0
C    <ip-spoke2>/24 is directly connected, Ethernet 1
```

What is claimed is:

1. A method for dynamically establishing a secure virtual private network, the method comprising the computer-implemented steps of:

associating a network security policy with a virtual private network interface at a first network device, wherein the first network device comprises a spoke router;

sending an address resolution request to an address resolution server, wherein the address resolution request is sent by the first network device and requests an address resolution for a second network device, wherein the address resolution request specifies a virtual private network endpoint address of the second network device, and wherein the second network device comprises a second spoke router;

in response to sending said address resolution request, receiving input that indicates an association of said virtual private network endpoint address to a corresponding routable network address of said second network device, wherein said routable network address of the second network device is a dynamically assigned network address;

wherein the routers comprise routers in a communication network;

in response to the receiving said input that indicates said association, issuing, to a security protocol module at the first network device, a message that includes the routable network address of the second network device and the network security policy associated with the virtual private network interface at the first network device;

receiving said message at said security protocol module at said first network device;

in response to receiving said message at said security protocol module, generating encryption state information for encrypting and transmitting network traffic from the first network device to the second network device, based on the message;

wherein the encryption state information includes one or more of:
  routable network address information,
  encapsulation protocol information, or
  security policy information.

2. The method of claim 1, further comprising the step of:
transmitting encrypted packets from the first network device to the second network device, based on the encryption state information.

3. The method of claim 1, wherein the step of receiving includes receiving input from a third network device configured as a hub router and as a next-hop server.

4. The method of claim 1, wherein the security protocol is IPsec and wherein the step of issuing a message to a security protocol module is based on the IPsec security protocol.

5. The method of claim 1, further comprising the step of:
initiating a key exchange between the first and second network devices which generates pairwise encryption/decryption keys for the first and second network devices.

6. The method of claim 5, further comprising the step of:
storing a security association associated with the first and second network devices that includes the pairwise encryption/decryption keys.

7. The method of claim 1, wherein the virtual private network is configured as a point-to-multipoint virtual private network, and wherein the steps of associating, receiving, issuing and generating are based on the point-to-multipoint virtual private network.

8. A method for dynamically establishing a secure multipoint virtual private network, the method comprising the computer-implemented steps of:

configuring a virtual private network interface on a first router by executing one or more configuration commands associated with the first router, wherein the first router comprises a spoke router;

sending an address resolution request to an address resolution server, wherein the address resolution request is sent by the first router and requests an address resolution for a second router, wherein the address resolution request specifies a virtual private network endpoint address of the second router, and wherein the second router comprises a second spoke router;

in response to sending said address resolution request, receiving at the virtual private network interface input that indicates a n association of said virtual private network endpoint address and a corresponding routable network address of said second router, based on one or more configuration commands associated with the first router, wherein said routable network address of the second router is a dynamically assigned network address;

wherein the routers comprise routers in a communication network;

in response to the receiving said input that indicates said association, receiving at a security protocol module at the first router a message that includes the routable network address of the second router and a network security policy associated with the virtual private network interface at the first router; and in response to receiving said message at said security protocol module, generating encryption state information for encrypting and transmitting network traffic from the first router to the second router, based on the message;

wherein the encryption state information includes one or more of:
  information relating to the routable network address,
  encapsulation protocol information, or
  the security policy information.

9. The method of claim 8, wherein the step of receiving an association includes receiving a next hop resolution protocol association.

10. The method of claim 9, wherein the step of receiving an association further comprises receiving a dynamic association associated with the second router as the second spoke router.

11. An apparatus for dynamically establishing a secure multipoint virtual private network, comprising:

a virtual private network interface,
  configured in association with a first routable network address that relates to a first router, and
  configured to access encryption policy information associated with traffic transmitted from the virtual private network interface;

an address resolution module communicatively coupled to the virtual private network interface and an encryption module, the address resolution module,
  configured to send an address resolution request to an address resolution server, wherein the address resolution request is sent by the first router and requests an address resolution for a second router, wherein the address resolution request specifies a virtual private network endpoint address of the second router, and wherein the second router comprises a second spoke router, and
  configured to receive, in response to sending said address resolution request, input that indicates an association of said virtual private network endpoint address to a corresponding second routable network address of said second router, wherein the second routable network address is a dynamically assigned network address, and configured to issue to said encryption module, in response to receiving said input that indicates said association, a message that includes the second routable network address of the second network device and the encryption policy information associated with traffic transmitted from the virtual private network interface;

said encryption module communicatively coupled to the address resolution module, the encryption module, configured to receive said message from said address resolution module, configured to establish, in response to receiving the message, a security association related to network traffic transmitted from the first routable network address to the second routable network address, configured to encrypt network traffic according to the encryption policy information, wherein the security association references the encryption policy information and a secret key for encrypting and decrypting traffic transmitted between the first routable network address and the second routable network address, and configured to generate, in response to receiving said message, encryption state information for encrypting and transmitting the network traffic from the first routable network address to the second routable network address, based on the message;

wherein the encryption state information includes one or more of:
routable network address information,
encapsulation protocol information, or
security policy information;

wherein the routers comprise routers in a communication network;

an Internet key exchange module configured to negotiate an exchange of the secret key between the encryption module and a second encryption module configured on a device associated with the second routable network address.

12. The apparatus of claim 11, wherein the encryption module uses IPsec protocol to encrypt network traffic from the first routable network address to the second routable network address.

13. A computer-readable medium storing one or more sequences of instructions for dynamically establishing a secure virtual private network, which instructions, when executed by one or more processors, cause the one or more processors to carry out the steps of:

associating a network security policy with a virtual private network interface at a first network device, wherein the first network device comprises a first spoke router;

sending an address resolution request to an address resolution server, wherein the address resolution request is sent by the first network device and requests an address resolution for a second network device, wherein the address resolution request specifies a virtual private network endpoint address of the second network device, and wherein the second network device comprises a second spoke router;

in response to sending said address resolution request, receiving input specifying that an association of said virtual private network endpoint address to a corresponding routable network address of said second network device, wherein said routable network address of the second network device is a dynamically assigned network address wherein the second network device comprises a second spoke router;

wherein the routers comprise routers in a communication network;

in response to the receiving said input that indicates said association, issuing to a security protocol module at the first network device a message that includes the routable network address of the second network device and the network security policy associated with the virtual private network interface at the first network device;

receiving said message at said security protocol module at said first network device;

in response to receiving said message at said security protocol module, generating encryption state information for encrypting and transmitting network traffic from the first network device to the second network device, based on the message; wherein the encryption state information includes one or more of:
routable network address information,
encapsulation protocol information, or
security policy information.

14. An apparatus for dynamically establishing a secure virtual private network, comprising:

means for associating a network security policy with a virtual private network interface at a first network device, wherein the first network device comprises a first spoke router;

means for sending an address resolution request to an address resolution server, wherein the address resolution request is sent by the first network device and requests an address resolution for a second network device, wherein the address resolution requests specifies a virtual private network endpoint address of the second network device, and wherein the second network device comprises a second spoke router;

means for receiving, in response to sending said address resolution request, input that indicates an association of said virtual private network endpoint address to a corresponding routable network address of said second network device, wherein said routable network address of the second network device is a dynamically assigned network address;

wherein the routers comprises routers in a communication network;

means for issuing, in response to receiving said input that indicates said association, to a security protocol module at the first network device, a message that includes the routable network address of the second network device and the network security policy associated with the virtual private network interface at the first network device;

means for receiving said message at said security protocol module at said first network device;

means for generating, in response to receiving said message at said security protocol module, encryption state information for encrypting and transmitting network traffic from the first network device to the second network device, based on the message;

wherein the encryption state information includes one or more of:
routable network address information,
encapsulation protocol information, or
security policy information.

15. The apparatus as recited in claim 14, further comprising:

means for transmitting encrypted packets from the first network device to the second network device, based on the encryption state information.

16. The apparatus as recited in claim 14, wherein the receiving means further functions to receive an input from a third network device configured as a hub router and as a next-hop server.

17. The apparatus as recited in claim 14, wherein the security protocol comprises IPsec and wherein the issuing means issues a message to a security protocol module based on the IPsec security protocol.

18. The apparatus as recited in claim 14, further comprising:
means for initiating a key exchange between the first and second network devices which generates pairwise encryption/decryption keys for the first and second network devices.

19. The apparatus as recited in claim 18, further comprising:
means for storing a security association associated with the first and second network devices that include the pairwise encryption/decryption keys.

20. The apparatus as recited in claim 14, wherein the virtual private network is configured as a point-to-multipoint virtual private network, and wherein the means for associating, receiving, issuing and generating perform functions that are based on the point-to-multipoint virtual private network.

21. The apparatus as recited in claim 14, further comprising:
means for transmitting encrypted packets from the first network device to the second network device, based on the encryption state information.

22. The apparatus as recited in claim 11 wherein one or more encrypted packets are transmitted from the first network device to the second network device, based on the encryption state information.

23. The apparatus as recited in claim 11 wherein the security protocol comprises IPsec and wherein the step of issuing a message to a security protocol module is based on the IPsec security protocol.

24. The apparatus as recited in claim 11 wherein a key exchange is initiated between the first and second network devices which generates pairwise encryption/decryption keys for the first and second network devices.

25. The apparatus as recited in claim 11 further comprising:
a storage for storing a security association associated with the first and second network devices that include the pairwise encryption/decryption keys.

26. The apparatus as recited in claim 11 wherein the virtual private network is configured as a point-to-multipoint virtual private network, and wherein the associating, receiving, issuing and generating functions are based on the point-to-multipoint virtual private network.

\* \* \* \* \*